May 7, 1935. H. A. WINTERMUTE 2,000,654
ELECTRICAL TREATMENT OF FLUIDS
Filed Dec. 17, 1932    3 Sheets-Sheet 3
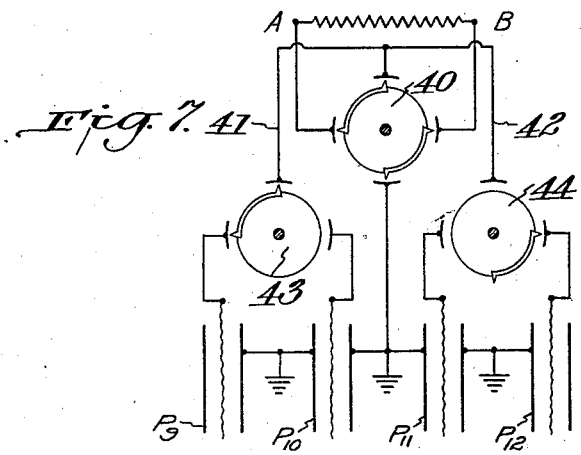
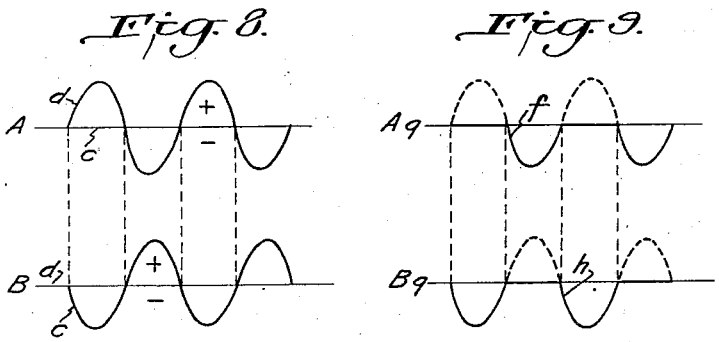
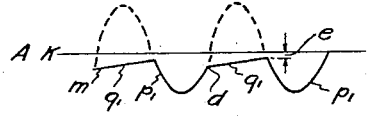
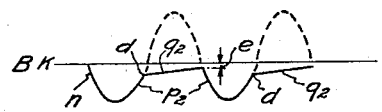
Inventor:
Harry A. Wintermute
By Byrnes, Townsend & Potter
Attorneys.

Patented May 7, 1935

2,000,654

UNITED STATES PATENT OFFICE 2,000,654

ELECTRICAL TREATMENT OF FLUIDS

Harry A. Wintermute, Plainfield, N. J., assignor to Research Corporation, New York, N. Y., a corporation of New York Application December 17, 1932, Serial No. 647,823

23 Claims. (Cl. 183—7)

This invention relates to electrical systems and methods for treating fluids and is especially applicable to gas cleaning plants where suspended particles are removed from gases by passing the gases between electrodes charged to different potentials. The invention is particularly directed towards improving the performance of treating plants which are comprised of a plurality of units energized from a common source of alternating current.

The principal objects of the invention are (1) to distribute electric energy to the various units of a multiple unit electric treater in an economical manner, (2) to separate the various units, electrically, so that the conditions present in one unit or group of units will not influence the treatment in another unit where the electrical conditions may be different, (3) to make the desired connections between the various units and the electrical energy source at such times and in such manner that undue surges or other disturbances will not be set up, and (4) to maintain the operation of the various units at high efficiency.

Other and more particular objects will be apparent from the detailed description of the invention which is to follow. In this description the conditions existing in a multiple unit Cottrell type electric precipitator for treating gases will be discussed to illustrate the advantages of the invention.

It has been recognized for many years that when different units of a Cottrell treater are connected in parallel to a common source of high voltage current, the different units frequently do not take the same amount of current or function at the same efficiency. In fact, this lack of uniformity and resulting poor performance in some of the units is commonly expected in the cleaning of certain metallurgical gases which do not "take current" readily. When gases are passed through two units in series, the electrical characteristics of the first unit, in which the gases contain the highest amount of suspended material, can be expected to be different from the characteristics of the second unit in which the gases are much less burdened with suspended particles. But differences are also found in units treating the gases in parallel when all the units are electrically connected in parallel.

The present invention has been very successfully used in supplying energy to different units or sections of a precipitator so that each unit functions properly and efficiently, uninfluenced by other units which may have different characteristics. It does this by providing energy directing means in the connections between the transformer supplying the high voltage current and the electrodes of the precipitators. These means change or transpose the connections, as the voltage and polarity of the energy source changes, in such manner that current cannot surge from one unit to another and the particular unit or group of units being energized has every opportunity to receive energy as intended.

In separating, electrically, the various units comprising a multiple unit treater it has been observed that not only was smoother and more uniform operation secured by energizing only one unit or one group of units at one time and energizing another unit at another time, independently of the first unit, but a saving of energy was realized with practically no loss of treating efficiency. Alternately energizing different treater units in a manner which makes possible the realization of the above objects is an important feature of the present invention.

Among other advantages provided by the invention, and which make it very useful, are: only one high voltage transformer is necessary to supply the energy to the various units; substantially the full voltage which can be obtained across the high voltage winding of the transformer is impressed across the complementary electrodes of the treater units; and the direction or polarity of the electric field within each unit, when it is energized, is the same and as predetermined.

Referring to the drawings which illustrate various embodiments of the invention:

Fig. 7 is a diagrammatic outline showing how four separate units can be energized progressively and separately from a single transformer in accordance with the invention; and Figs. 8, 9 and 10 are graphs to illustrate the voltages impressed across the electrodes, with relation to time, when the different connections are used.

Figure 1:
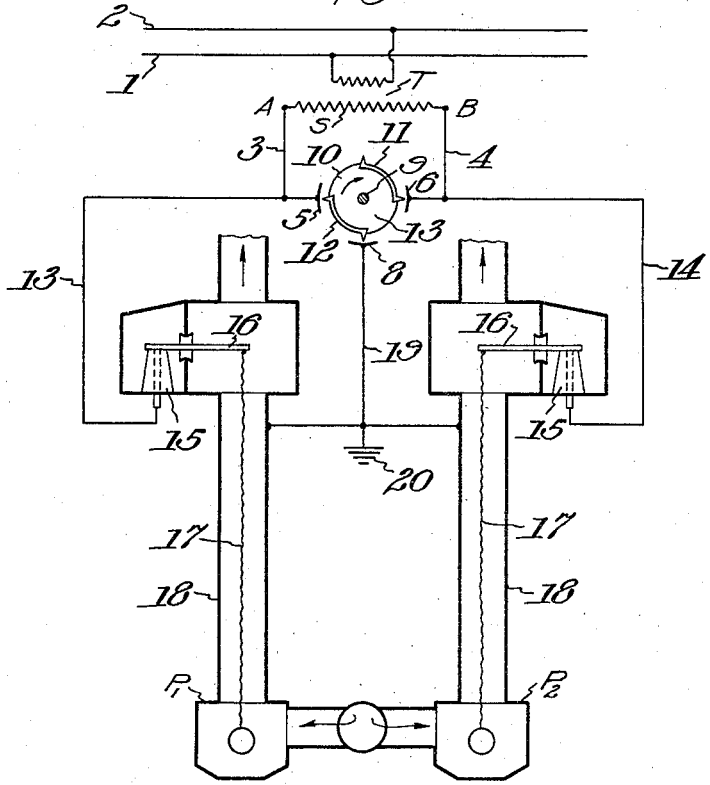
Fig. 1 shows, in sectional elevation, two treater units of the pipe type treating gas in parallel from a common source and electrically connected in accordance with the invention.

Referring to Fig. 1, numerals 1, 2, designate a low voltage alternating current supply circuit furnishing current at, for illustration, 60 cycles per second and 440 volts (root means square) to high voltage transformer T with high voltage winding S having terminals A and B. Transformer T steps the voltage up to say 60,000 volts (r. m. s.) and the treater units P₁ and P₂ are energized at this voltage. The treaters P₁ and P₂ are shown in a conventional manner. Discharge electrode 17, which may be a wire or chain or twisted rod, is surrounded by collecting electrode 18, which is a gas tight tube presenting a large surface for the termination of lines of force comprising the electric field between 17 and 18 upon which material may be deposited as it is electrically removed from the gas. It also serves as a restraining enclosure for the gas while it passes through the electric field for treatment. Discharge electrode 17, depending from member 16, is insulated from collecting electrode 18 and the remainder of the precipitator by the combined supporting insulator and inlet bushing 15. Electrode 17 can, therefore, be subjected to a voltage much different from that applied to electrode 18.

Discharge electrode 17 of P₁ is connected permanently to terminal A by conductors 13 and 3 and discharge electrode 17 of P₂ is similarly connected to B by conductors 14 and 4. Collecting electrodes 18 of P₁ and P₂ are alternately connected to A and B through a common conductor 19 and the conductive shoes of a mechanical rectifying switch 10. This switch, which is of the Lemp type and turns in synchronism with the source of current (i. e. at 1800 R. P. M. for 60 cycle current), is similar to those commonly in use except that there is no need for four stationary shoes and only three are provided, designated by numerals 5, 6 and 8. The conducting strips 11 and 12 are mounted on insulating disc 13 which is mounted upon and rotated by shaft 9 and alternately connect first one terminal and then the other terminal of transformer winding S to the collecting electrodes 18, 18, and to ground 20. Fig. 1 shows strip 12 connecting shoes 5 and 8 and grounding terminal A through conductor 19. When the connections are as shown in Fig. 1, discharge electrode 17 in P₁, which is connected to A by 13 and 3, is also grounded. In P₁, with these connections, there is no potential difference between 17 and 18, no electrical field and corona discharge and no electrical energy being expended. With these connections, discharge electrode 17 of P₂, connected by 14 and 4 to terminal B, is at the potential of B. The opposing electrodes 17 and 18 within P₂ are at the instant as far apart in voltage as are the terminals A and B of transformer winding S and the electric field set up between them can be expected to effectively remove suspended particles from gases passing through the field. When shaft 9 turns 90 mechanical degrees in the direction indicated by the arrow, the voltage relationship in the transformer will have changed 180 electrical degrees, and terminal B will be at the same voltage but of opposite polarity with relation to the potential of A. At this time conducting strip 11 will be connecting stationary shoes 6 and 8 and will be grounding terminal B and there will be no difference of potential within P₂. The opposing electrodes of P₁ will now be at the potential difference of A and B and electrical precipitation will result therefrom in that unit.

Figure 2:
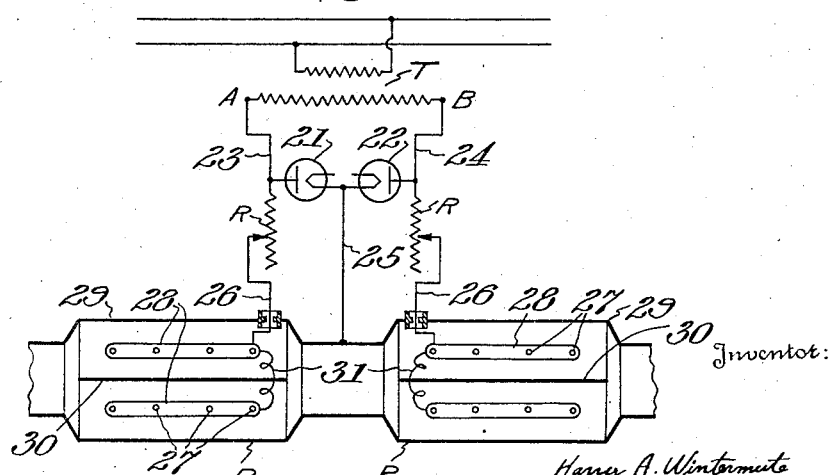
Fig. 2 shows, in a sectional plan view, two treater units of the plate type treating a gas stream in series and electrically connected in accordance with the invention.

The arrangement shown in Fig. 2 gives results similar to those obtained with the arrangement in Fig. 1, but in Fig. 2 two thermionic rectifiers 21 and 22 are used in place of the mechanical rectifier in Fig. 1. The anode of 21 is connected to terminal A by conductor 23 and the anode of rectifier 22 is connected to terminal B by conductor 24. The cathodes of both rectifiers are connected to the casings and the collecting electrodes of treater units P₃ and P₄ by conductor 25. In these treaters the side walls 29 function as collecting electrodes. Another wall 30 divides the unit into two parallel passages and this functions as a collecting electrode. Suspended vertically in the passages between 29 and 30 are discharge electrodes 27 depending from supports 28 and connected in parallel by 28 and conductors 31, 26 and 23 or 24 to terminal A or B of the transformer. The discharge electrodes in P₃ are permanently connected to A and those in P₄ to B. The collecting electrodes and flues are all conductively joined and are permanently connected to conductor 25. Variable resistances R, R, are for the purpose of ballasting the electric circuits of which they are a part, and as they are adjustable, one resistance can be made to furnish greater impedance and voltage drop than the other, with the result that a lower voltage can be impressed across the complementary electrodes of one unit should the gas passing in that unit be more conductive than the gas passing in the other unit.

In operation, when the voltage of terminal A is positive with respect to conductor 25 and the collecting electrodes connected thereto, current will easily pass through the rectifier 21 connected to A and the potentials of 27 and 29 and 30 in P₃ will be substantially the same. No energy will be expended in P₃ when this condition exists. The potential of terminal B is now negative with relation to A and to conductor 25, and as current cannot pass through rectifier 22 when the anode is negative, the full voltage difference between terminals A and B is across that rectifier and consequently the same voltage difference is present between collecting electrodes 29, 30, and their complementary discharge electrodes 27 in unit P₄. In the next half cycle of the current supply, terminal B is positive and rectifier 22 by-passes the current from the transformer around P₄. The complementary electrodes of P₃ are now at full potential difference and the gas paths between them become part of the electric circuit.

With the hookups of Figs. 1 and 2, connections are established every other half cycle, by means of the mechanical switch 10 in Fig. 1 and by means of thermionic rectifiers 21 and 22 in Fig. 2, whereby the complementary electrodes of each unit are brought to equal potential every other half cycle, and during that half cycle, full transformer voltage is impressed across the complementary electrodes of the other unit. This set of conditions has been found to give good results in practice, but even better results may be secured in some installations by isolating the discharge electrodes of one unit during the half cycle that the discharge electrodes of the other unit are being charged. In other words, the potential of any discharge electrode is never allowed to drop to the potential of its complementary collecting electrode, even during the periods when it is bypassed or isolated from the unit undergoing energization. In the embodiment shown in Fig. 3, this isolation of the discharge electrodes of alternate units during alternate half cycles is brought about by thermionic rectifiers 33 and 34. Otherwise the electrical connections are the same as those shown in Fig. 2. As shown, rectifier 33 permits current to flow readily from terminal A to discharge electrode 35 when A is negative with relation to 35, but when A is positive, rectifier 33 acts as a closed electrical valve and the charge on 35 can only get away by leaking through the gas surrounding 35 to the collecting electrode. Spark gaps may be used in place of rectifiers 33 and 34 with satisfactory results, but the vacuum tube rectifiers, although much more expensive, seem to give smoother circuit conditions.

Figure 3:
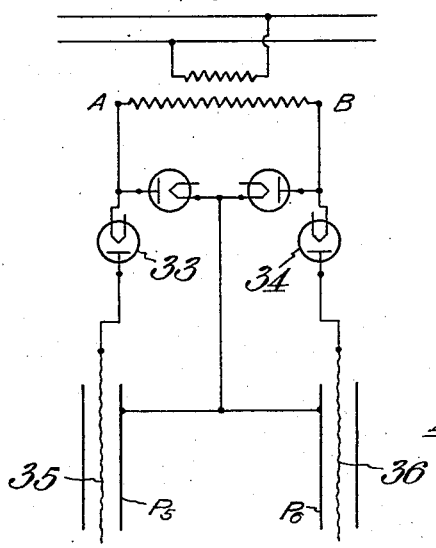
Figs. 3, 4, 5 and 6 are diagrammatic sketches showing connections for realizing the invention in a somewhat different manner when two units or groups of units are to be alternately energized.
Figure 4:
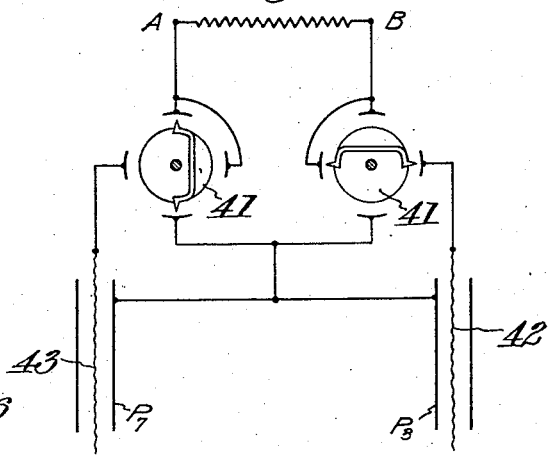
Figure 5:
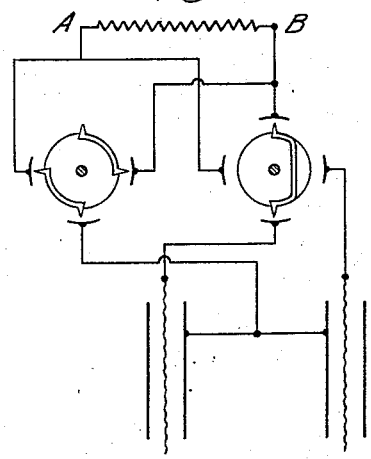
Figure 6:
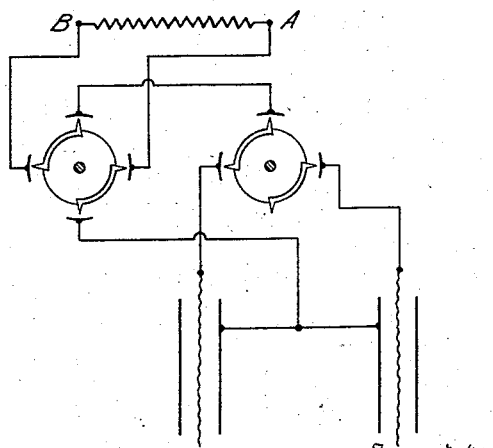

Figs. 4, 5 and 6 show circuits in which the results obtained in the circuit of Fig. 3 can be obtained with mechanical switch rectifiers. All the switches shown are turned with four pole synchronous motors and rotate 90 mechanical degrees while the alternating current source changes through 180 electrical degrees. The two switches of any arrangement shown in these figures can, therefore, be rotated by the same motor if that is a convenient manner of operation. In Fig. 4 the switching is accomplished with two switches, each of which has a single radially positioned conductive arm 41, 41. If terminal A is positive and terminal B is negative when the switches are in the position shown in Fig. 4, the collecting electrodes of both units will be positive, discharge electrode 42 of unit P8 will be negative, and discharge electrode 43 of unit P7 will be isolated. Upon electrode 43 will be the residual charge from the previous half cycle. It will be again energized during the next half cycle when terminal A is negative and conductors 41 have been rotated through 90 mechanical degrees. The collecting electrodes are always positive.

Fig. 5 shows a somewhat different arrangement of the connections with one rectifier having two circumferentially arranged rotating conductors and one rectifier having a single radially positioned rotating conductor. The results obtained are the same as with the arrangement of Fig. 4. In Fig. 6, two rectifiers are shown, each with two circumferentially positioned rotating conductors.

It is sometimes advisable to divide an electrical precipitator into more than two units or sections and to energize each unit independently of the others. Fig. 7 shows how this can be done by using the principles of the present invention. The four units indicated are connected through three mechanical switches to the high voltage winding of a transformer. Rectifier 40 causes the current in conductors 41 and 42 to be of a chosen polarity at all times. Rectifying switch 43, making one complete revolution for every two complete cycles of the supply current, connects unit P9 to one of the half cycles and unit P10 to another half cycle during that period. Switch 44 separately connects unit P11 and P12 to the supply source during the other two half cycles during the two cycle period.

Figs. 8, 9 and 10 show graphically the voltages impressed across the opposing electrodes of precipitator units when the units are connected to a transformer through various connections. On the graphs, time is measured horizontally and voltage is measured vertically. The alternating current supply is assumed to have sine wave characteristics and no attempt has been made to show in any detail the variations that will result from the switching operations and certain capacity effects in the high voltage circuit of the transformer.

Fig. 8 indicates the voltage conditions present when one side of the secondary winding of a transformer is permanently connected to one electrode of a precipitator unit and this is kept at constant voltage, say by grounding. Looking at the upper curve A of Fig. 8, the horizontal line $c$ represents the voltage at the collecting electrode of a precipitator unit when it is permanently connected to one terminal of a transformer, and to ground. The sine wave $d$ represents the voltage with relation to $c$ that is impressed upon the discharge electrode, when the discharge electrode is connected directly to the other terminal of the secondary winding of the transformer and no rectifying means is used. This voltage relationship causes the field between the opposing electrodes to be an alternating one as regards polarity and is seldom used in electrical precipitation. The lower graph B in Fig. 8 illustrates what the relationship during the same time interval would be if the other terminal was held at constant voltage and the other side of the circuit, connected to the first mentioned terminal, was insulated and permitted to vary in voltage with the supply source.

Fig. 9 illustrates the voltage relationship between the opposing electrodes when they are energized in accordance with Figs. 1 and 2. The upper graph A in Fig. 9 shows the voltage between discharge electrode 17 and collecting electrode 18 in precipitator $P_1$, during a two cycle interval, and the lower graph B shows the voltage relationship across the complementary electrodes in unit $P_2$ during the same interval. In both units the collecting electrodes are maintained at constant voltage, which is usually, but need not be, at ground potential, as represented by $g$, and the discharge electrode voltages in $P_1$ and $P_2$ vary as shown by $f$ and $h$, respectively. This figure shows plainly the results secured with the switching arrangements of Figs. 1 and 2. The units receive energy alternately, but the complementary electrodes are always energized at the same polarities; and no energy is supplied to the units during approximately one-half the time.

Fig. 10 shows the voltage relationship existing if the circuit of one unit is opened and isolated during the half of the cycle that the other unit is being energized. This condition results from the arrangements of Figs. 3, 4, 5 and 6. Here again it is convenient to assume, and it is in accordance with common technical practice to do so, that the collecting electrodes are held at constant voltage with respect to ground potential as represented by straight lines $k$ and all voltage variations are at the discharge electrode. Line $m$ represents the voltage with respect to $k$ at the discharge electrodes of units $P_5$, $P_7$, $P_9$, and $P_{11}$ during a two cycle period and $n$ represents the voltage with respect to $k$ at the discharge electrodes of units $P_6$, $P_8$, $P_{10}$ and $P_{12}$ during the same period. These lines in Fig. 10 illustrate how the voltages follow the sine wave characteristic, as indicated at $p_1$ and $p_2$, of the supply source, while the discharge electrodes are connected to either terminal A or B while these terminals are ungrounded and how the voltages gradually drop after the discharge electrodes are disconnected and isolated from the supply as indicated by the relatively straight lines $q_1$ and $q_2$. While the gas being treated in the respective units is subjected to relatively little ionization during the intervals represented by $q_1$ and $q_2$, that is, after the discharge electrodes are disconnected (which occurs at point $d$), there still remains an electric field of constant polarity and appreciable strength during the periods $q_1$ and $q_2$ and this is useful in removing particles which are already associated with the free electric charges liberated during periods $p_1$ and $p_2$. When a discharge electrode is again to be energized during a subsequent half cycle $p_1$ or $p_2$ it is not necessary to build up the voltage from ground potential as in the arrangements of Figs. 1 and 2 and illustrated in Fig. 9, but from a voltage $e$. This makes for economy in current expenditure.

The curves representing the voltages in circuits including vacuum tube rectifiers will be somewhat different from the curves showing conditions when mechanical switch rectifiers are used. An important difference is that the voltage immediately following the peak voltage goes down with the transformer voltage if a mechanical rectifier is used, but if a vacuum tube is in the line, none of the charge can return through the tube to the transformer and the voltage drop is due only to the leakage of the charge through the gas to the collecting electrode. Therefore, when vacuum tubes are used, the decrease in voltage from the peak voltage to the minimum voltage $e$ will be more gradual than is shown for example in Fig. 10.

When vacuum tube rectifiers are used to control the flow of current, the flow is stopped at times when a reversal of polarity sets in across the tube. The voltage drop across the tube at such times is approximately zero. Flow begins again with the next reversal and at approximately zero voltage across the tube. This makes for switching with very little disturbance to the circuits.

With mechanical rectifiers the switching can be effected with very little surging, especially with the arrangements shown in Figs. 4, 5 and 6 by having the stationary shoes of proper length and their setting circumferentially at proper position.

It is stated that the full voltage across the transformer terminals exists across the complementary electrodes during energization. It is to be understood that a small drop, between 100 and 1000 volts depending upon the rectifiers used, is necessary to force the current through the spark gaps of the rectifiers and this drop must be subtracted from the transformer voltage.

When electrodes oppose one another, as in the units just described, and comprise the opposite terminals for an electric field, they may be said to be complementary. In apparatus for the electrical precipitation of suspended particles from gases, complementary electrodes usually comprises a discharge electrode and a collecting electrode insulated therefrom, the former having points, or sharp edges, or surfaces of great degree of curvature and the collecting electrode being relatively broad in extent, and of low curvature. When a great difference of potential exists between these electrodes, a visible (so-called corona) discharge is present at the surface of the discharge electrode while no visible discharge is present adjacent the surface of the collecting electrode. The present invention makes possible the energization of a system comprising a plurality of complementary electrodes in such manner that every discharge electrode, upon energization, is of the same polarity,—the polarity which is found to give the most efficient results. More detailed discussion of the characteristics of corona, of both positive and negative polarity, will be found in Patent No. 1,067,974 to Cottrell. The collecting electrodes are usually maintained at ground potential as are the supporting members, headers and flues, but such an arrangement is not necessary. With proper insulation the collecting electrodes can be maintained above ground potential and the discharge electrodes can be at ground potential or both can be kept above ground potential while at potentials different from each other.

For illustrating the invention it is convenient to show a treater or precipitator unit as made up of a single collecting electrode and a single complementary discharge electrode; but in practice a unit usually comprises the electrodes upon which a rather extended electric field terminates, or upon which several adjacent electric fields terminate. In Fig. 2, for instance, the treater unit $P_3$ is made up of a structure confining two parallel gas streams and the necessary electrodes for subjecting both gas streams to high potential electric fields. Such a precipitator division, which is really made up of several units, is often referred to as a section; but inasmuch as all the electrodes are energized through a single pair of electrical connections, it will be called a unit. In general, the more varied the characteristics of the gas in different parts of a precipitator and the more refractory the gas from a treating standpoint, the more necessary it is to divide the precipitator into small units and energize them separately. The present invention permits two precipitators, receiving gas from different sources, to be energized from a single transformer which cannot ordinarily be done when the energy is delivered to them simultaneously in the usual manner.

I claim:

1. A system for energizing a plurality of electrical precipitator units each consisting of at least one discharge electrode and complementary collecting electrode, comprising a transformer adapted to supply high voltage alternating current, electrical connections from the high potential terminals of said transformer to the electrodes of said units, said connections including energy directing devices adapted to pass each half wave of the alternating current at the same polarity and at substantially the full potential of the transformer successively to the electrodes of alternate groups of electrical precipitator units.

2. A system for energizing a plurality of electrical precipitator units wherein the discharge electrodes of each unit are separately insulated from the discharge electrodes of the other units, comprising a transformer adapted to supply high voltage alternating current, electrical connections from the high potential terminals of said transformer to the electrodes of said units, said connections including energy directing devices adapted to pass each half wave of the alternating current at the same polarity and at substantially the full potential of the transformer successively to the electrodes of alternate groups of electrical precipitator units.

3. A system for energizing a plurality of electrical precipitator units each consisting of at least one discharge electrode and complementary collecting electrode, comprising a transformer adapted to supply high voltage alternating current, electrical connections from the high potential terminals of said transformer to the electrodes of said units, said connections including a mechanical switch operated in synchronism with the variations in current supplied by the transformer so as to charge alternate groups of units with substantially the full potential of the transformer during each half wave period.

4. A system for energizing a plurality of electrical precipitator units each consisting of at least one discharge electrode and complementary collecting electrode, comprising a transformer adapted to supply high voltage alternating current, electrical connections from the high potential terminals of said transformer to the electrodes of said units, said connections including a mechanical switch operated in synchronism with the variations in current supplied by the transformer so as to connect the discharge electrodes of alternate groups of units with the high potential terminals of the transformer during each half wave period.

5. An electrical precipitation apparatus comprising two units each comprising at least one discharge electrode and complementary collecting electrode, means for passing fluids to be treated through said units, a source of high voltage alternating current, and means for alternately connecting the source of current at substantially full potential across the electrodes of one unit during one half wave period of the current and across the electrodes of the other unit at the same polarity during the succeeding half wave period.

6. An electrical precipitation apparatus comprising two units each comprising at least one discharge electrode and complementary collecting electrode, means for passing fluids to be treated through said units, a source of high voltage alternating current, and means for alternately connecting the source of current at substantially full potential across the electrodes of one unit during one half wave period of the current and across the electrodes of the other unit at the same polarity during the succeeding half wave period and for isolating the electrodes of said units in alternation during the half wave periods in which the electrodes of said units are not connected to the source of current.

7. An electrical precipitation apparatus comprising two units wherein the discharge electrodes of one unit are separately isolated from the discharge electrodes of the other unit, means for passing fluids to be treated through said units, a source of high voltage alternating current, and means for alternately connecting the source of current at substantially full potential across the electrodes of one unit during one half wave period of the current and across the electrodes of the other unit at the same polarity during the succeeding half wave period.

8. An electrical precipitation apparatus comprising two units each comprising at least one discharge electrode and complementary collecting electrode, means for passing fluids to be treated through said units, a source of high voltage alternating current, and mechanical switching means for alternately connecting the source of current at substantially full potential across the electrodes of one unit during one half wave period of the current and across the electrodes of the other unit at the same polarity during the succeeding half wave period.

9. An electrical precipitation apparatus comprising two units each comprising at least one discharge electrode and complementary collecting electrode, means for passing fluids to be treated through said units, a source of high voltage alternating current, and thermionic rectifiers for alternately connecting the source of current at substantially full potential across the electrodes of one unit during one half wave period of the current and across the electrodes of the other unit at the same polarity during the succeeding half wave period.

10. An electrical precipitation apparatus comprising two units each comprising at least one discharge electrode and complementary collecting electrode, means for passing fluids to be treated through said units, a source of high voltage alternating current, and mechanical switching means for alternately connecting the source of current at substantially full potential across the electrodes of one unit during one half wave period of the current and across the electrodes of the other unit at the same polarity during the succeeding half wave period and for isolating the electrodes of said units in alternation during the half wave periods in which the electrodes of said units are not connected to the source of current.

11. An electrical precipitation apparatus comprising two units each comprising at least one discharge electrode and complementary collecting electrode, means for passing fluids to be treated through said units, a source of high voltage alternating current, and thermionic rectifiers for alternately connecting the source of current at substantially full potential across the electrodes of one unit during one half wave period of the current and across the electrodes of the other unit at the same polarity during the succeeding half wave period and for isolating the electrodes of said units in alternation during the half wave periods in which the electrodes of said units are not connected to the source of current.

12. An electrical precipitation apparatus comprising two units each comprising at least one discharge electrode and complementary collecting electrode, means for passing fluids to be treated in parallel through said units, a source of high voltage alternating current, and means for alternately connecting the source of current at substantially full potential across the electrodes of one unit during one half wave period of the current and across the electrodes of the other unit at the same polarity during the succeeding half wave period.

13. An electrical precipitation apparatus comprising two units each comprising at least one discharge electrode and complementary collecting electrode, means for passing fluids to be treated serially through said units, a source of high voltage alternating current, and means for alternately connecting the source of current at substantially full potential across the electrodes of one unit during one half wave period of the current and across the electrodes of the other unit at the same polarity during the succeeding half wave period.

14. A method of energizing apparatus for electrically treating fluids including a plurality of treater units each of which comprises at least one discharge electrode and complementary collecting electrode, said method comprising impressing successive half wave impulses from a source of high tension alternating current across the electrodes of successive units in rotation, said impulses being impressed at the same polarity and at substantially the full potential of the current source.

15. A method of energizing apparatus for electrically treating fluids including a plurality of treater units each of which comprises at least one discharge electrode and complementary collecting electrode, said method comprising impressing successive half wave impulses from a source of high tension alternating current across the electrodes of successive units in rotation, said impulses being impressed at the same polarity and at substantially the full potential of the current source and isolating the electrodes of successive units during the half wave period immediately succeeding that in which they are charged.

16. A method of operating an electrical precipitator having complementary discharge and collecting electrodes which comprises intermittently impressing across said electrodes homopolar half waves of a high potential alternating current at the full available potential and establishing connections whereby said electrodes are brought to the same potentials between impressions of voltage thereacross.

17. A system for electrically treating gaseous fluids comprising a source of high voltage alternating current, a plurality of treater units each of which comprises at least one discharge electrode and complementary collecting electrode, means connecting said electrodes with said source of high voltage alternating current including energy directing devices adapted to impress substantially the full voltage of the current supply intermittently across the complementary electrodes of alternate groups of treater units so as to produce in each of said groups when energized an electrical field of the same polarity and to bring the complementary electrodes to the same potential between impressions of voltage thereacross.

18. A system for electrically treating gaseous fluids comprising a high voltage transformer having its low voltage winding connected to a source of alternating current, a plurality of treater units each of which comprises at least one discharge electrode and complementary collecting electrode, connecting means between said electrodes and the secondary winding of the transformer, said connecting means including mechanical rectifiers adapted to impress substantially the full voltage supplied by the secondary of the transformer intermittently across the complementary electrodes of alternate groups of treater units so as to produce in each of said units when energized an electrical field of the same polarity and to bring the complementary electrodes to the same potential between impressions of voltage thereacross.

19. A system for electrically treating gaseous fluids comprising a high voltage transformer having its low voltage winding connected to a source of alternating current, a plurality of treater units each of which comprises at least one discharge electrode and complementary collecting electrode, connecting means between said electrodes and the secondary winding of the transformer, said connecting means including thermionic rectifiers adapted to impress substantially the full voltage supplied by the secondary of the transformer intermittently across the complementary electrodes of alternate groups of treater units so as to produce in each of said units when energized an electrical field of the same polarity and to bring the complementary electrodes to the same potential between impressions of voltage thereacross.

20. A system for electrically treating gaseous fluids comprising a high voltage transformer having its low voltage winding connected to a source of alternating current, a plurality of treater units each of which comprises at least one discharge electrode and complementary collecting electrode, connecting means between said electrodes and the secondary winding of the transformer, said connecting means including rotating switch rectifiers operated in synchronism with the variation in voltage of the current supplied by the transformer adapted to impress substantially the full voltage supplied by the secondary of the transformer intermittently across the complementary electrodes of alternate groups of treater units so as to produce in each of said units when energized an electrical field of the same polarity and to bring the complementary electrodes to the same potential between impressions of voltage thereacross.

21. Apparatus for electrically energizing a plurality of treater units comprising a high voltage transformer having its low voltage winding connected to a source of alternating current, a plurality of treater units, each of which comprises at least one pair of complementary electrodes, means connecting one electrode of each of said pairs of complementary electrodes to one of the high voltage terminals of the transformer, and means connecting the opposed electrodes of said pairs in common to both of the high voltage terminals of the transformer, said last named common connecting means including energy directing devices adapted to alternately disconnect one and the other of said high voltage terminals from said common connecting means in synchronism with the alternations of current, whereby substantially the full voltage of the current supply is intermittently impressed across the complementary electrodes of the treater units so as to produce in each of said units when energized an electrical field of the same polarity.

22. Apparatus for electrically energizing a plurality of treater units comprising a high voltage transformer having its low voltage winding connected to a source of alternating current, a plurality of treater units, each of which comprises at least one pair of complementary electrodes, means connecting one electrode of each of said pairs of complementary electrodes to one of the high voltage terminals of the transformer, and means connecting the opposed electrodes of said pairs in common to both of the high voltage terminals of the transformer, said last named common connecting means including mechanical switch rectifiers adapted to alternately disconnect one and the other of said high voltage terminals from said common connecting means in synchronism with the alternations of current; whereby substantially the full voltage of the current supply is intermittently impressed across the complementary electrodes of the treater units so as to produce in each of said units when energized an electrical field of the same polarity.

23. Apparatus for electrically energizing a plurality of treater units comprising a high voltage transformer having its low voltage winding connected to a source of alternating current, a plurality of treater units, each of which comprises at least one pair of complementary electrodes, means connecting one electrode of each of said pairs of complementary electrodes to one of the high voltage terminals of the transformer, and means connecting the opposed electrodes of said pairs in common to both of the high voltage terminals of the transformer, said last named common connecting means including thermionic rectifiers adapted to alternately disconnect one and the other of said high voltage terminals from said common connecting means in synchronism with the alternations of current, whereby substantially the full voltage of the current supply is intermittently impressed across the complementary electrodes of the treater units so as to produce in each of said units when energized an electrical field of the same polarity.

HARRY A. WINTERMUTE.